United States Patent [19]

Heniges

[11] Patent Number: 4,887,560
[45] Date of Patent: Dec. 19, 1989

[54] CRANKSHAFT ASSEMBLY FOR VARIABLE STROKE ENGINE FOR VARIABLE COMPRESSION

[76] Inventor: William B. Heniges, 3325 SE. 120th Ave., Portland, Oreg. 97266

[21] Appl. No.: 208,452

[22] Filed: Jun. 20, 1988

[51] Int. Cl.[4] .............................................. F02B 75/04
[52] U.S. Cl. ............................ 123/78 F; 123/197 AC
[58] Field of Search .............. 123/78 R, 78 BA, 78 F, 123/48 B, 56 AC, 56 BC, 197 R, 197 AB, 197 AC

[56] References Cited

U.S. PATENT DOCUMENTS

| | | | |
|---|---|---|---|
| 1,111,252 | 9/1914 | Eagle | 123/78 F |
| 1,599,319 | 9/1926 | Crowe | 123/78 F |
| 3,861,239 | 1/1975 | McWhorter | 123/78 F |
| 4,485,768 | 12/1984 | Heniges | 123/197 R |

FOREIGN PATENT DOCUMENTS

| | | | |
|---|---|---|---|
| 3127760 | 3/1983 | Fed. Rep. of Germany | 123/78 F |
| 0064131 | 5/1980 | Japan | 123/78 F |

*Primary Examiner*—David A. Okonsky
*Attorney, Agent, or Firm*—James D. Givnan, Jr.

[57] ABSTRACT

A crankshaft carried crankpin carries an eccentric interposed between the crankpin and the slider of a yoke type engine. The eccentric carries a gear to permit rotatable adjustment to be imparted to the eccentric about the crankpin axis. Positioning of the eccentric includes the use of a gear train. A gear set in the gear train has displaceable gears carried by a carrier responsive to engine control means. The movable gear set serves to accelerate or decelerate the rotational speed of a pair of shaft mounted driven gears to momentarily alter their rotational speed so as to in turn rotate the eccentric mounted gear to reorientate the eccentric to the crankpin. Such relocating of the eccentric serves to alter the piston stroke between high and low compression ranges.

10 Claims, 1 Drawing Sheet

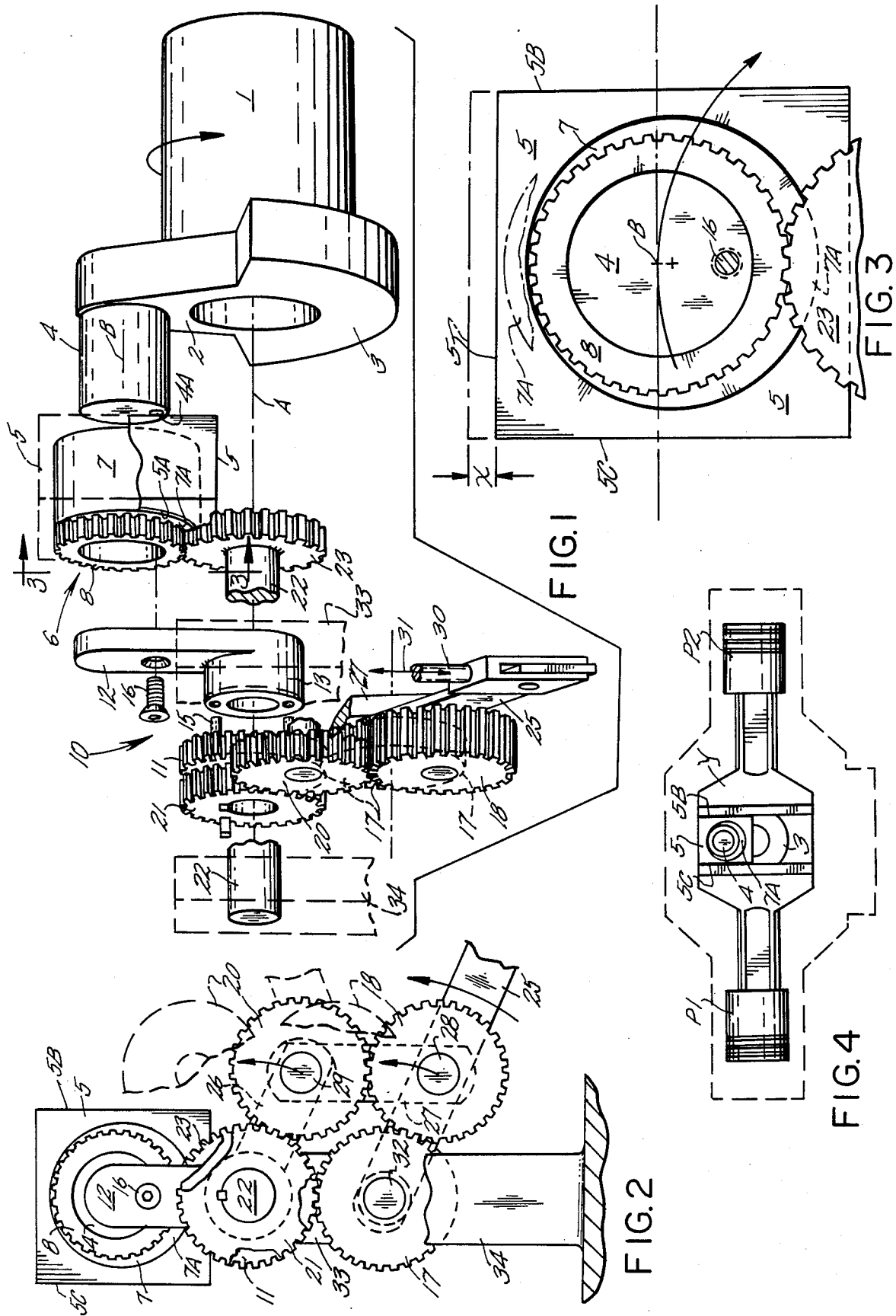

CRANKSHAFT ASSEMBLY FOR VARIABLE STROKE ENGINE FOR VARIABLE COMPRESSION

BACKGROUND OF THE INVENTION

The present invention concerns a crankshaft assembly effecting variable piston stroke and hence an engine with a variable compression ratio.

U.S. Pat. No. 4,485,768, issued to the present inventor, was based upon an engine having the capability of operating through a range of different strokes and compression ratios. A drive mechanism of the engine included gear sets provided for the purpose of shifting the rotational axis of the engine crankshaft for the purpose of altering the effective throw of a crankpin and piston stroke. While the proposed mechanism constituted a substantial contribution to engine art, the complexity of the engine was objectionable. The background of the variable stroke engine as set forth in the above U.S. patent is incorporated herein by reference to the extent such background is relevant.

U.S. Pat. No. 3,861,239 discloses an engine connecting rod journalled on an eccentric.

Prior engine art includes engines with combustion chambers with auxiliary chambers for the purpose of varying engine compression ratio per U.S. Pat. No. 4,182,288. Further, the prior art includes engines with opposed pistons wherein a slider element is lever mounted and moves about an adjustable fulcrum enabling varying of the piston stroke as shown in British Pat. No. 229,430. For certain reasons engine designs embodying mechanisms for varying compression have not resulted in engines accepted by the public. An apparent shortcoming of known engine designs is that the proposed designs are cumbersome, of doubtful reliability with components subject to unacceptable loads. Further, proposed variable stroke engines result in objectionable engine envelopes as per the engine in U.S. Pat. Nos. 4,270,495, 3,686,972 discloses an eccentric on a crankpin of a crankshaft.

SUMMARY OF THE PRESENT INVENTION

The present invention is embodied within a crankshaft assembly utilizing an eccentric carried by a crankpin with the eccentric being controlled to enable controlling of piston stroke.

In the present crankshaft assembly, a crankpin carries an eccentric/bushing which is positionable about a crankpin axis in an infinite manner to effect changes in the orbital path of a piston driven component, such as for example, the slider block of a yoke type engine. Eccentric positioning means includes a gear train including displaceable gears which, when displaced, momentarily accelerate or decelerate an eccentric positioning gear to arcuately reposition the eccentric. Eccentric control means are provided which may be responsive to one or more engine parameters to enable eccentric positioning and hence stroke changes to be automatically accomplished. The eccentric positioning means is of compact design to permit incorporation within engine blocks of conventional size and configuration. The eccentric positioning means utilized takes into consideration bearing speed problems and with a view toward minimizing power loss and wear due to friction.

Important objectives of the present crankshaft assembly are the provisions of a compact mechanism which may be located in the engine block and driven directly off the engine crankshaft assembly and which is capable of positioning an eccentric to determine piston stroke length; the provision of a variable compression crankshaft assembly utilizing an eccentric to alter the orbit of a slider block about a crankshaft axis with the orbital path determining piston stroke and engine compression ratio.

BRIEF DESCRIPTION OF THE DRAWINGS

In the accompanying drawings:

FIG. 1 is an exploded view of the present crankshaft assembly with certain engine block components shown in phantom lines;

FIG. 2 is an end elevational view taken from the left end of FIG. 1;

FIG. 3 is a vertical sectional view taken approximately along line 3—3 of FIG. 1; and FIG. 4 is a front elevational view of the yoke of a Scotch yoke engine outlined in phantom lines.

DETAILED DESCRIPTION OF THE PREFERRED EMBODIMENTS

With continuing attention to the drawings wherein applied reference numerals indicate parts similarly hereinafter identified, the reference numeral 1 indicates a crankshaft of the present assembly.

The crankshaft includes a web 2 integral with a counterbalance 3. Preferably the crankshaft is of tubular construction. A crankpin 4 is carried by web 2.

Indicated at 5 is piston driven means such as a slider block when the present crankshaft assembly is utilized in a Scotch yoke type engine. While the term slider block may be used in the description to facilitate an understanding of the invention, it will be understood that a bearing sleeve could be utilized instead and on which a connecting rod (s) could be journalled.

Indicated at 6 are eccentric means carried by crankpin 4 and housed within a bore 5A in slider block 5. A gear 8 is carried by eccentric bushing 7 and protrudes beyond the slider block. Gear 8, as later explained, causes an eccentric bushing 7 to be positioned in an arcuate manner about crankpin 4. An eccentric bushing lobe is at 7A.

Indicated generally at 10 are eccentric positioning means including a first gear 11 carried by a crankshaft arm 12 having a boss 13. Pins 15 on the first gear seat within boss defined bores. The outer end of crankshaft arm 12 is secured to the end of crankpin 4 by means of a locking element 16 which seats within a crankpin defined bore 4A. From the foregoing, it will be seen that upon orbiting of crankpin 4 about crankshaft axis A, rotation will be imparted to first gear 11 via crankpin 4 and crankshaft arm 12.

A gear set including gears 17, 18 and 20 is driven by reason of gear 17 being in mesh with first gear 11. Gear 20 of the gear set drives companion gears 21 and 23 on a common shaft 22. Shaft 22 extends through arm boss 13 and through first gear 11 thereon. Accordingly, during engine operation, the rotational speeds of the gears will be uniform (with the exception of gear 8 orbiting crankshaft axis A) resulting in the relationship of eccentric bushing 7 to slider block 5 being changed. Eccentric bushing 7 is positionable about a crankpin axis at B. It will be appreciated also that, during engine operation, and without actuating control means 30, gears 11, 21 and 23 rotate at crankshaft speed and in the crankshaft direction.

Carrier means are provided for displacing certain gears of the gear set; namely, gears 18 and 20 for the purpose of altering the rotational speed of companion driven gears 21 and 23 on shaft 22. Said carrier means is disclosed as a parallelogram linkage 25, 26 and 27 with the links apertured to receive stub shafts 28 and 29 carrying gears 18 and 20 respectively. Control means at 30 imparts movement to links 25, 26 and 27 for displacement of gears 18 and 20 about gears 17 and 21 respectively. The proximal end of link 25 swings about a shaft 32 carried by supports 33 and 34 which also carry crankshaft arm boss 13 and shaft 22. The control means 30 terminates in coupled engagement (not shown) with an actuator imparting movement as indicated at 31 with the actuator being of the type responsive to signals representing selected engine parameters. For example, an actuator of the control means may be a stepper type electric motor responsive to electrical signals generated by a computer.

From the foregoing it will be seen that piston stroke may be varied by the rotational positioning of eccentric lobe 7A about crankpin axis B. For example, upward displacement of control 30 will momentarily decrease the rotational speed of gear 18, gear 20 and companion gears 21 and 23 on shaft 22. With crankpin 4 moving clockwise and with gear 23 momentarily slowed or retarded, it will be seen that eccentric bushing 7 and specifically lobe 7A thereon will be repositioned about crankpin axis B to assume its broken line position of FIG. 3. The slider block 5 will now have a larger orbit as represented by its broken line position of FIG. 3. The larger orbit of slider block 5 results in the piston stroke increasing a distance equal to 2× for high compression.

To return to the low compression or reduced stroke configuration shown in full lines in FIG. 3, the control 30 is lowered resulting in gears 18, 20 and companion gears 21 and 23 momentarily increasing rotational speeds to return eccentric bushing lobe 7A to its full line (low compression) position of FIG. 3. Such momentary changes in the rotational speed of gear 23 accordingly effects partial rotation of gear 8 and bushing 7 about crankpin axis B as the entire crankshaft assembly rotates about axis A. Slider block surfaces at 5B and 5C, in sliding engagement with engine yoke at Y, will cause an increase in yoke travel in both directions a distance equal to X resulting in a total stroke change of 2X for pistons P1 and P2.

While I have shown but one embodiment of the invention, it will be apparent to those skilled the art that the invention may be embodied still otherwise without departing from the spirit and scope of the invention.

Having the described the invention, what is desired to be secured by a Letters Patent is:

1. A crankshaft assembly for a variable compression engine with reciprocating pistons and including,
   a crankshaft assembly including a web, a crankpin, a crankshaft arm,
   piston driven means carried by said crankpin,
   eccentric means including an eccentric bushing rotatably carried by said crankpin and interposed between the crankpin and said piston driven means, said eccentric means including an eccentric mounted gear whereby adjusted rotation of the eccentric means relative the crankpin will alter the spacial relationship of the eccentric and the piston driven means to the crankshaft axis to alter piston stroke, and
   eccentric positioning means including a gear train comprising a first gear driven by said crankshaft arm for rotation about the crankshaft axis, a gear set driven by said first gear with certain gears of said set being displaceable, carrier means supporting said certain gears, control means coupled to said carrier means for positioning same and said certain gears, driven gears powered by said gear set with one of said driven gears in mesh with said eccentric mounted gear to impart arcuate rotation to same to alter the relationship of the eccentric bushing to said piston driven means to thereby determine piston stroke.

2. The crankshaft assembly claimed in claim 1 wherein said piston driven means is a slider block in a scotch yoke engine.

3. The crankshaft assembly claimed in claim 1 wherein said certain gears are embodied in a pair of gears arcuately displaceable about different axes by said control means.

4. The crankshaft assembly claimed in claim 1 wherein said first gear and said driven gears are coaxial.

5. The crankshaft assembly claimed in claim 1 wherein said crankshaft arm couples said crankpin to said first gear for driving same about the crankshaft axis.

6. The crankshaft assembly claimed in claim 5 wherein said driven gears of the eccentric positioning means rotate about an extension of the crankshaft axis.

7. The crankshaft assembly claimed in claim 6 wherein said driven gears are mounted on a common shaft.

8. The crankshaft assembly claimed in claim 7 wherein said crankshaft arm includes a boss through which said common shaft extends.

9. A crankshaft assembly for a variable stroke-compression engine with reciprocating pistons,
   a crankshaft including a crankpin, a crankshaft arm carried by said crankpin,
   an eccentric bushing on said crankpin,
   a slider block carried by said eccentric bushing and having an orbital path determining the stroke of said pistons,
   a gear on said eccentric bushing, and
   eccentric bushing positioning means including a control gear in mesh with said gear on said eccentric bushing, a control shaft coaxial with the crankshaft axis of rotation, means momentarily increasing and decreasing the rotational speed of said control shaft relative the speed of said crankshaft to alter the relationship of the eccentric bushing to the slider block and hence alter the orbital path of the slider block.

10. The crankshaft assembly claimed in claim 8 wherein one end of said control shaft intrudes into the crankpin plane of rotation.

* * * * *